United States Patent
Kim et al.

(10) Patent No.: US 8,515,634 B2
(45) Date of Patent: Aug. 20, 2013

(54) SHIFT CONTROL METHOD FOR AUTOMATIC TRANSMISSION IN FOUR-WHEEL DRIVE VEHICLE

(75) Inventors: Byungjun Kim, Gunpo-si (KR); Taekyoung Lee, Suwon-si (KR)

(73) Assignee: Kefico Corporation (KR)

( * ) Notice: Subject to any disclaimer, the term of this patent is extended or adjusted under 35 U.S.C. 154(b) by 994 days.

(21) Appl. No.: 12/593,903

(22) PCT Filed: Jul. 11, 2007

(86) PCT No.: PCT/KR2007/003357
§ 371 (c)(1), (2), (4) Date: Sep. 29, 2009

(87) PCT Pub. No.: WO2008/120840
PCT Pub. Date: Oct. 9, 2008

(65) Prior Publication Data
US 2010/0138120 A1    Jun. 3, 2010

(30) Foreign Application Priority Data

Mar. 30, 2007    (KR) .................. 10-2007-0031235

(51) Int. Cl.
*B60W 10/00*    (2006.01)
(52) U.S. Cl.
USPC ................. 701/55; 701/36; 701/51; 701/56; 701/57; 701/58
(58) Field of Classification Search
None
See application file for complete search history.

(56) References Cited

U.S. PATENT DOCUMENTS

| 4,781,081 | A | * | 11/1988 | Shibata et al. | 477/143 |
| 5,345,843 | A | * | 9/1994 | Fujita et al. | 477/98 |
| 2004/0106500 | A1 | * | 6/2004 | Ayabe et al. | 477/117 |
| 2005/0143221 | A1 | * | 6/2005 | Kuwahara et al. | 477/97 |

(Continued)

FOREIGN PATENT DOCUMENTS

| JP | 61-001538 A | 1/1986 |
| JP | 61-041067 A | 2/1986 |

(Continued)

OTHER PUBLICATIONS

International Search Report Dated Dec. 28, 2007 of Parent Application PCT/KR2007/003357 Filed Jul. 11, 2007 —2 pages.

(Continued)

*Primary Examiner* — Jonathan M Dager
(74) *Attorney, Agent, or Firm* — Knobbe Martens Olson & Bear LLP

(57) ABSTRACT

The present invention relates to a method of controlling a shift of an automatic transmission of a four-wheel low-speed drive vehicle, in which when a four-wheel low-speed drive mode is selected, it is possible to accomplish an appropriate operational condition for the four-wheel low-speed drive mode that can realize a variety of operational conditions of the vehicle while effectively limiting additional use of memories for storing shift patterns, by controlling a shift point of the automatic transmission to be appropriate for the four-wheel low-speed drive mode with appropriate change in a basic shift pattern according to a basic operational condition to consider together with the four-wheel low-speed drive mode without separately using a specific shift pattern and by controlling the apply and release parts to be appropriate for the control of the shift point, thereby it is possible to ensure a stable and smooth shift.

5 Claims, 3 Drawing Sheets

(56) References Cited

U.S. PATENT DOCUMENTS

| | | | |
|---|---|---|---|
| 2006/0064225 A1* | 3/2006 | Tabata et al. | 701/96 |
| 2006/0252593 A1* | 11/2006 | Inoue et al. | 475/116 |
| 2007/0117677 A1* | 5/2007 | Ayabe et al. | 477/115 |
| 2010/0075801 A1* | 3/2010 | Suzuki et al. | 477/44 |

FOREIGN PATENT DOCUMENTS

| | | |
|---|---|---|
| JP | 04-088256 A | 3/1992 |
| JP | 04-140556 A | 5/1992 |
| JP | 05-248532 A | 9/1993 |
| JP | 06-193723 A | 7/1994 |
| JP | 08-219242 A | 8/1996 |
| JP | 10-148252 A | 6/1998 |

OTHER PUBLICATIONS

Office Action dated Mar. 21, 2012 of corresponding Korean Patent Application No. 2010-501999—3 pages.

* cited by examiner

SHIFT CONTROL METHOD FOR AUTOMATIC TRANSMISSION IN FOUR-WHEEL DRIVE VEHICLE

TECHNICAL FIELD

The present invention relates to a method of controlling a shift of an automatic transmission of a four-wheel drive vehicle, and in particular, to a method of controlling a shift point and controlling hydraulic pressure for an apply-part and a release-part when a four-wheel drive vehicle is driven in a four-wheel low-speed drive mode.

BACKGROUND ART

Four-wheel drive vehicles can achieve a four-wheel low-speed drive mode (hereafter, referred to as '4L mode') that is used when it needs a larger drive force than a two-wheel high-speed drive mode (hereafter, referred to as '2H mode') or a four-wheel high-speed drive mode (hereafter, referred to as '4H mode') that is used in common travel. These four-wheel drive vehicles achieve the 4L mode by generally re-decelerating the rotatory force outputted from the automatic transmission using a planetary gear set in a transfer box.

When a driver selects the 4L mode, a shift point of the automatic transmission is controlled by a shift pattern corresponding to the 4L mode.

Otherwise, at a constant vehicle speed of driving wheels, the speed of the output shaft and the engine speed become considerably higher than during normal driving due to a changed transmission gear ratio of the transfer box, such that a significant mechanical load is applied to the engine and the automatic transmission and thus durability of the power train is reduced.

Further, when the engine speed is considerably increased due to the above reason, a fuel cut-off of the engine is controlled to protect the power train. However, when a shift is performed while controlling the fuel cut-off of the engine, the shift is not smoothly performed and passengers feel a shift shock.

In order to overcome the above problems, in the related art, an individual shift pattern for a 4L mode is additionally provided. Accordingly, when a driver selects the 4L mode, the automatic transmission is controlled according to the individual shift pattern for the 4L mode, which is different from the shift pattern in a normal driving.

DISCLOSURE OF INVENTION

Technical Problem

However, when the individual shift pattern for the 4L mode is provided as described above, an additional memory is required to store the shift pattern. Further, when the 4L mode is selected together with another mode including a specific shift pattern, other than normal patterns such as a sports mode or a snow mode, which has been selected before, there is a problem in selecting the appropriate pattern.

In order to solve this problem, one solution is to provide an additional shift pattern that is suitable for both modes selected together, but it also has a problem in that a large amount of additional memory is required. Further, when considering vehicles equipped with an automatic transmission that are provided with a plurality of individual shift patterns that is differentiated according to driving conditions of the vehicles, such as when they drive up-hill or down-hill road, the required memory is considerably increased to provide individual shift patterns by considering a case when the 4L mode is selected together.

In order to overcome the above problems, it is an object of the invention to provide a method of controlling a shift of an automatic transmission in a 4L mode of a four-wheel drive vehicle. According to the invention, when the 4L mode is selected, a shift point of the automatic transmission is controlled so as to be suitable for the 4L mode by appropriately changing a basic shift pattern according to a basic operating condition that is considered together with the 4L mode without separately using a stored shift pattern. Further, the apply-part and the release-part of the automatic transmission are controlled so as to be suitable for the control of the shift point. As a result, it is possible to accomplish an appropriate operational condition suitable for the 4L mode that can realize a variety of operational conditions of the vehicle while effectively limiting additional use of memories for storing additional shift patterns.

Technical Solution

An embodiment of the present invention provides a method of controlling a shift of an automatic transmission of a four-wheel drive vehicle, including: finding a correction throttle opening by multiplying the present throttle opening by a first correction factor in a four-wheel low-speed drive mode; finding a correction shift index by multiplying a shift index at the vehicle speed that corresponds to the correction throttle opening by a second correction factor; and determining whether to execute a shift or not by comparing the present vehicle speed with the correction shift index.

Further, another embodiment of the present invention provides a method of controlling a shift of an automatic transmission of a four-wheel drive vehicle, including correcting a basic shift pattern in a four-wheel low-speed drive and estimating the shift point by comparing the present vehicle speed with a throttle opening. The correcting of the basic shift pattern includes: reducing the scale of the throttle opening-axis by multiplying a constant while keeping the shift lines of the basic shift pattern constant; and moving the shift lines of the basic shift pattern along the vehicle speed-axis to the low speed side.

Advantageous Effects

According to the embodiments of the invention, when a four-wheel low-speed drive mode is selected, it is possible to accomplish an appropriate operational condition of the four-wheel low-speed drive mode that can realize a variety of operational conditions of the vehicle while effectively limiting additional use of memories for storing shift patterns, by controlling a shift point of the automatic transmission so as to be suitable for the four-wheel low-speed drive mode by appropriately changing a basic shift pattern according to a basic operational condition to be considered together with the four-wheel low-speed drive mode without separately using a specific shift pattern for only the four-wheel low-speed drive and by controlling the apply-part and the release-part of the automatic transmission so as to be suitable for the control of the shift point, thereby it is possible to ensure a stable and smooth shift.

BRIEF DESCRIPTION OF THE DRAWINGS

For better understanding of the nature and objects of the present invention, reference should be made to the following detailed description with the accompanying drawings, in which.

BEST MODE FOR CARRYING OUT THE INVENTION

Hereinafter, preferred embodiments of the invention are described with reference to accompanying drawings.

Figure 1:
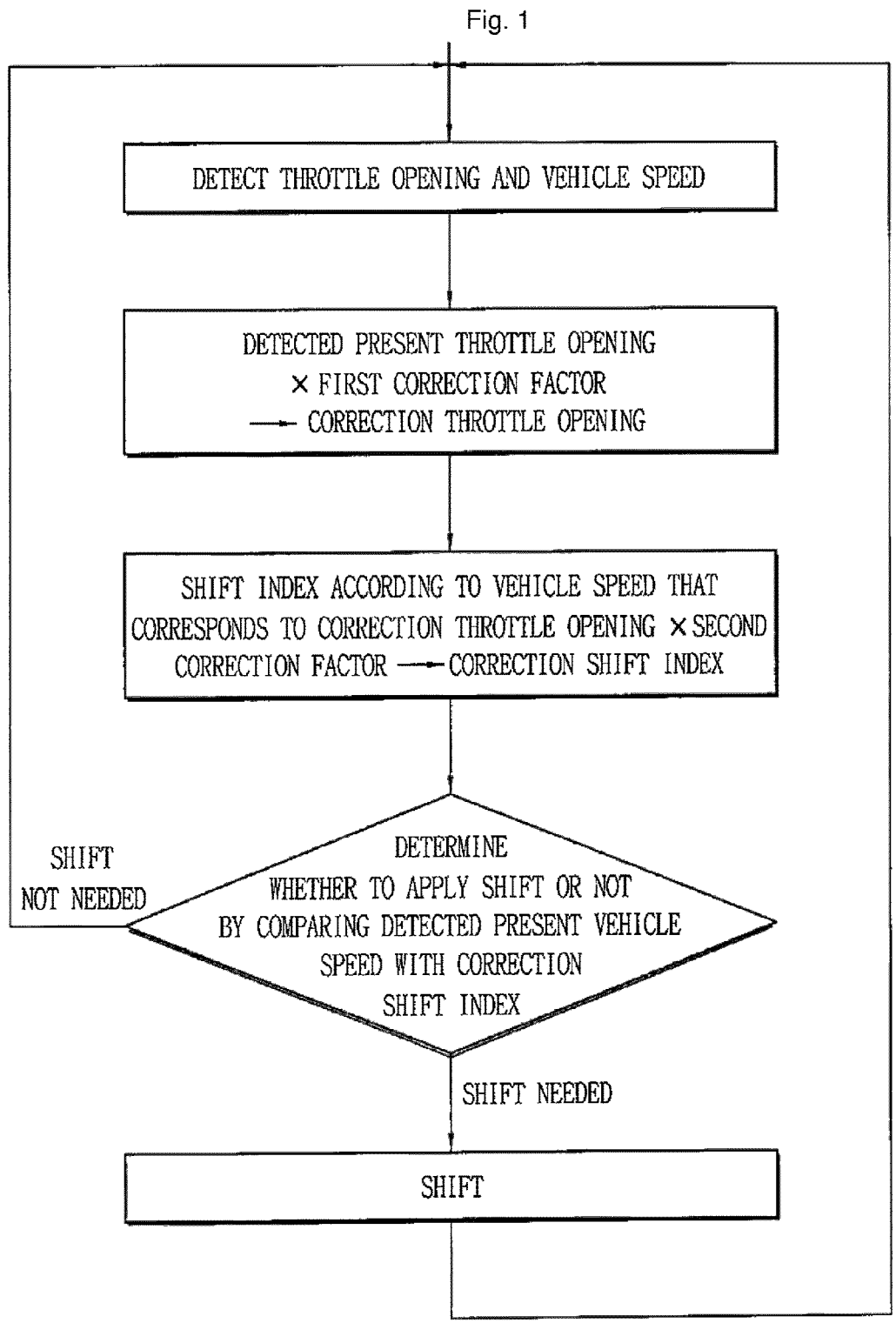
FIG. 1 is a flowchart illustrating a method of controlling a shift of an automatic transmission in a four-wheel low-speed drive mode of a four-wheel drive vehicle according to an embodiment of the invention.

Referring to FIG. 1, an embodiment of the invention includes: finding a correction throttle opening by multiplying the present throttle opening by a first correction factor; finding a correction shift index by multiplying a shift index according to a vehicle speed corresponding to the correction throttle opening at a basic shift pattern by a second correction factor; and determining whether a shift is made by comparing the present vehicle speed with the correction shift index.

The basic shift pattern means all shift patterns, not a shift pattern for a 4L mode, that is, shift pattern that has been basically previously selected depending on conditions of a vehicle, before considering selection of the 4L mode. In detail, the basic pattern commonly includes all of the patterns for various modes, such as a normal drive mode, a sports mode, a snow mode, and a hill road mode. According to an embodiment of the invention, when the 4L mode is selected, the basic shift pattern is appropriately changed and then used.

Figure 2:
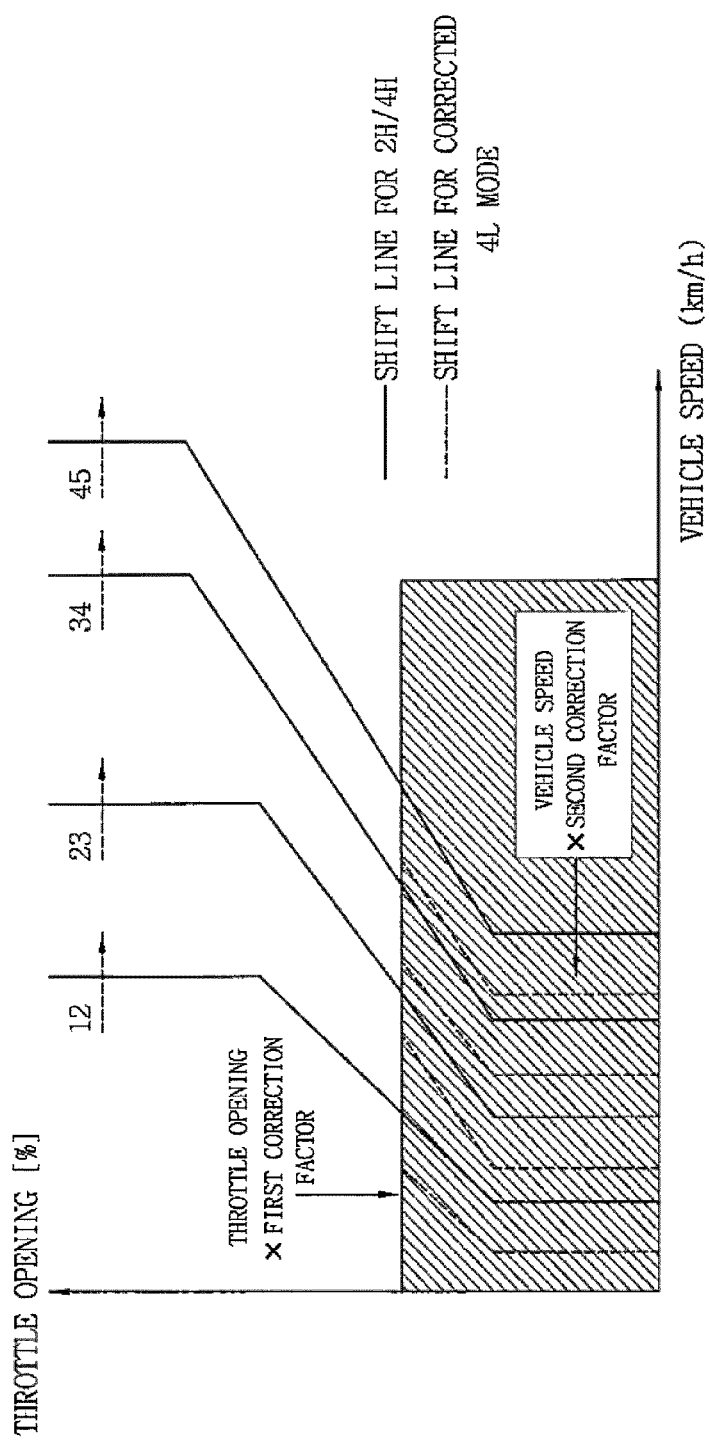
FIG. 2 is a view showing shift patterns for illustrating the invention.

FIG. 2 shows an example that in a normal drive mode, that is, when a general shift pattern for 2H/4H mode is set into a basic shift pattern, a 4L mode is selected and the basic shift pattern is corrected into a shift pattern for the 4L mode.

To better understand, when illustrating that a shift is determined by finding the correction throttle opening and the correction shift index, it may be described that a shift point is determined by estimating the present vehicle speed and a throttle opening from the shift pattern as shown in FIG. 2.

The basic shift pattern shown in FIG. 2 is corrected by reducing the scale of the throttle opening-axis by multiplying a constant while keeping the shift lines of the basic shift pattern constant, and then moving the shift lines of the basic shift pattern along the vehicle speed-axis to the low speed side. The constant that is multiplied to reduce the scale of the throttle opening-axis is the first correction factor and the movement of the shift lines along the vehicle speed-axis to the low speed side is the same as multiplying the shift index by the second correction factor. The first correction factor and the second correction factor are values that are larger than 0 and smaller than 1.

The corrected shift patterns are indicated by dotted lines in the hatched area and the vertical axis, the throttle opening-axis is reduced in scale with the shift lines constant. Therefore, when the present throttle opening is multiplied by the first correction factor, a throttle opening that is reduced in scale by the first connection factor is specified at the corrected shift pattern. The shift lines at the shift patterns are expressed into shift indexes that are index values depending on the speed of the vehicle, and when the shift indexes are multiplied by the second correction factor, same result are generated as the shift lines move from the solid lines to the shift lines at the left, as shown in FIG. 2.

As a result, determining whether to apply a shift or not, by finding a correction throttle opening by multiplying the present throttle opening by the first correction factor, finding a correction shift index by multiplying a shift index according to a vehicle speed corresponding to the correction throttle opening at the basic shift pattern, and then comparing the present vehicle speed with the correction shift index, is the same as determining a shift point after estimating the present vehicle speed and a throttle opening from a corrected shift pattern as shown in FIG. 2.

However, according to an embodiment of the invention, as shown in FIG. 2, a corrected individual shift pattern is not stored in a memory in advance, it is determined to apply a shift or not by calculating according to the method as described above and the same effect as using a corrected pattern is accomplished.

Therefore, according to an embodiment of the invention, using an additional memory is effectively prevented, and when the 4L mode is selected under various driving conditions of the vehicle, a significant load to the power train including the engine and the automatic transmission is reduced, the durability is improved and a stable and smooth shift is ensured by sufficiently considering the present condition of the vehicle and applying a new shift pattern considering the 4L mode in real time.

When the shift lines move left by equally multiplying the shift indexes indicating the shift lines by the second correction factor, a predetermined constant, the distances between the shift lines are decreased, which means shifts according to increase of the vehicle speed are more quickly applied.

Therefore, it may frequently occur for a driver to execute rapid shift into several successive gear shift, in which, when a more rapid shift is not applied than a common case, not the 4L mode, a shift continues to the next stage before the number of rotation of the turbine of the automatic transmission is sufficiently reduced after shifting into a gear. When this operation is repeated at successive gear shift, the engine speed is excessively increased, which causes a significant mechanical load to the engine and the automatic transmission and the fuel cut-off of the engine, such that shifting is not smoothly applied due to vibration of the power train.

It is needed to execute rapid shift by reducing the time for the shifting to solve the above problem.

Accordingly, according to an embodiment of the invention, when a shift is applied by determining a shift, the hydraulic pressure for apply and release parts of the automatic transmission is controlled by increasing/decreasing the basic hydraulic pressure in the basic hydraulic pressure control diagram that is expressed by changes in hydraulic pressure to time according to a predetermined rule, such that it is possible to more rapidly complete the shift.

Figure 3:
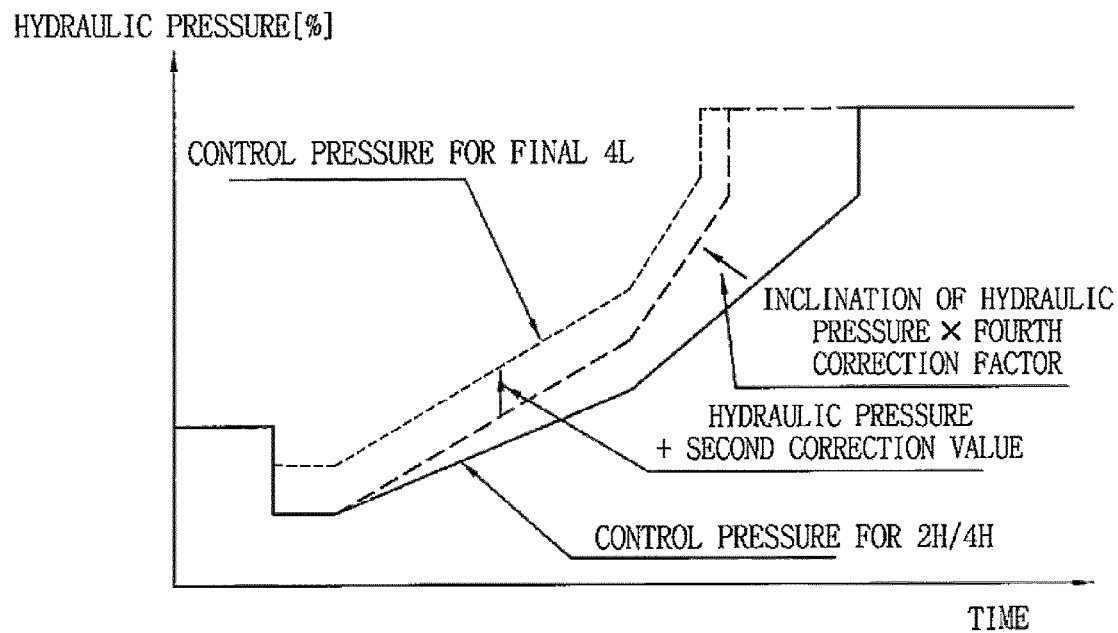
FIG. 3 is a diagram illustrating hydraulic control for controlling an apply-part and a release-part of an automatic transmission.

The basic hydraulic pressure control diagram shows changes in hydraulic pressure in respect to time as shown in FIG. 3 and means a hydraulic pressure control diagram that is used under common driving conditions, not the 4L mode.

Several methods of increasing/decreasing the basic hydraulic pressure in the basic hydraulic pressure control diagram according to a predetermined rule can be considered, for example, increasing the basic hydraulic pressure by multiplying the inclination of the basic hydraulic pressure that shows changes in the basic pressure in respect to time by a constant third correction factor in the ranges where the basic hydraulic pressure is not 0, increasing the basic hydraulic pressure by adding a constant first value to the basic hydraulic pressure, and increasing/decreasing the basic hydraulic pressure by combining the above two methods, that is, multiplying the inclination of the basic hydraulic pressure by a constant fourth correction factor and adding a constant second correction value.

FIG. 3 shows the method of combining the above two methods, that is, increasing/decreasing the basic hydraulic pressure by multiplying the inclination of the basic hydraulic pressure by the constant fourth correction factor and adding the constant second correction value. The methods are appropriately selected by the designer's intention, depending on the power train and the vehicle to apply.

For reference, the fourth correction factor has the effect of increasing/decreasing the ascending inclination of the line showing the hydraulic pressure in respect to time and the second correction value has the effect of off-setting the line upward.

The first correction value, the second correction value, and the fourth correction factor are also appropriately selected depending on the vehicle to apply and determined by experiment and analysis.

As described above, when the hydraulic pressure for the apply and release parts in the operating parts of the automatic transmission is controlled by increasing/decreasing more than common cases, the apply and release parts are more rapidly connected, as a result, the number of rotations of the turbine is rapidly reduced and the time for shift is reduced accordingly.

Therefore, an excessive increase in the number of rotations of the turbine and the rpms of the engine is effectively prevented, such that it is possible to ensure durability of the power train including the engine and the automatic transmission and achieve stable and smooth shifting by preventing control of the fuel cut-off of the engine.

The invention claimed is:

1. A method of controlling a shift of an automatic transmission of a four-wheel drive vehicle, comprising:
   correcting a basic shift pattern in a four-wheel low-speed drive mode; and
   estimating a shift point by correlating a present speed of the vehicle with a throttle opening,
   wherein the correcting the basic shift pattern includes:
   reducing a scale of a throttle opening-axis by multiplying a constant while keeping shift lines of the basic shift pattern constant; and
   moving the shift lines of the basic shift pattern along a vehicle speed-axis to a low speed side.

2. The method as defined in claim 1, wherein when a shift is applied as a result of the determination of the shift point, hydraulic pressure for the apply and release parts of the automatic transmission is controlled by increasing/decreasing the basic hydraulic pressure that is expressed by changes in the hydraulic pressure in respect to time in a basic hydraulic pressure control diagram according to a predetermined rule.

3. The method as defined in claim 2, wherein the increasing/decreasing the basic hydraulic pressure in the basic hydraulic pressure control diagram according to a predetermined rule is achieved by multiplying inclination of the basic hydraulic pressure that is inclination of a line showing changes in the basic hydraulic pressure in respect to time by a constant third correction factor in the ranges where the inclination of the basic hydraulic pressure to time is not 0.

4. The method as defined in claim 2, wherein increasing/decreasing the basic hydraulic pressure in the basic hydraulic pressure control diagram according to a predetermined rule is achieved by adding a constant first correction value to the basic hydraulic pressure.

5. The method as defined in claim 2, wherein increasing/decreasing the basic hydraulic pressure in the basic hydraulic pressure control diagram according to a predetermined rule is achieved by multiplying the inclination of the basic hydraulic pressure by a fourth correction factor and adding a constant second correction value.

* * * * *